June 6, 1967
K. B. CURTIS
3,323,434
APPARATUS FOR SOUND AND IMAGE PRINTING OF
IRRADIATION SENSITIVE FILM
Filed Sept. 24, 1964
8 Sheets-Sheet 1
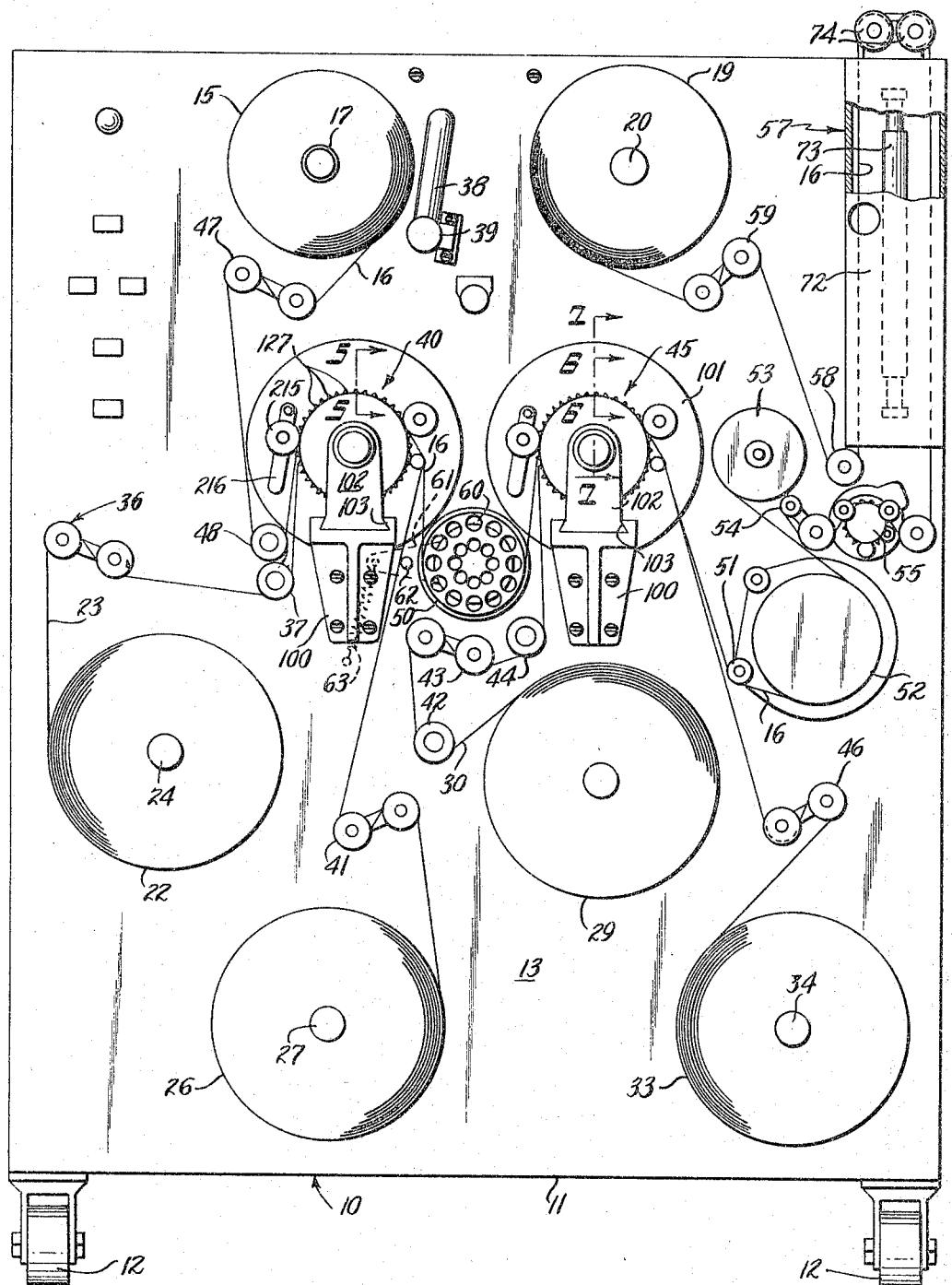
Fig.1.
INVENTOR.
KENNETH BURTON CURTIS
BY
ATTORNEYS INVENTOR.
KENNETH BURTON CURTIS
BY
Lyon & Lyon
ATTORNEYS

INVENTOR.
KENNETH BURTON CURTIS
BY
ATTORNEYS

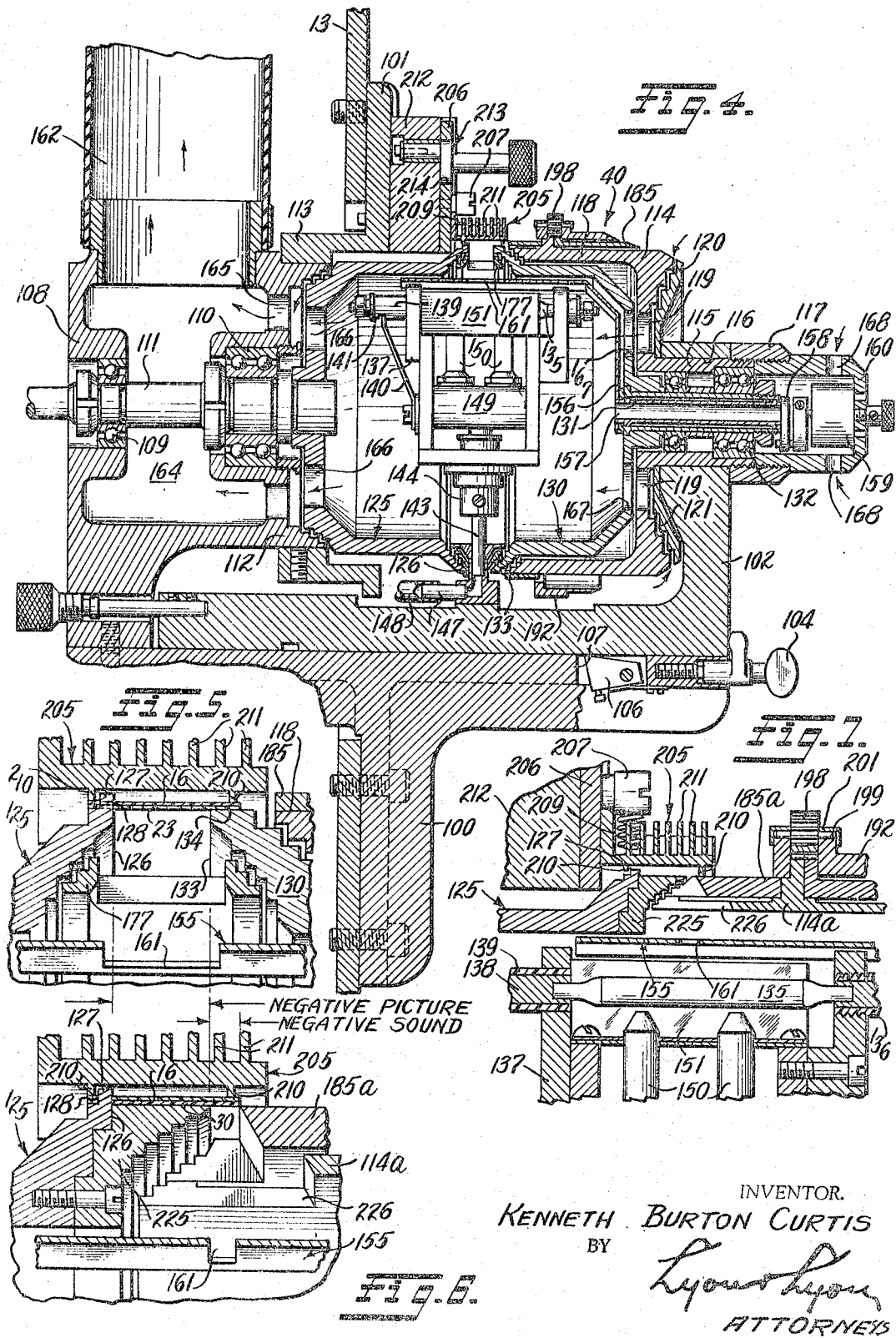

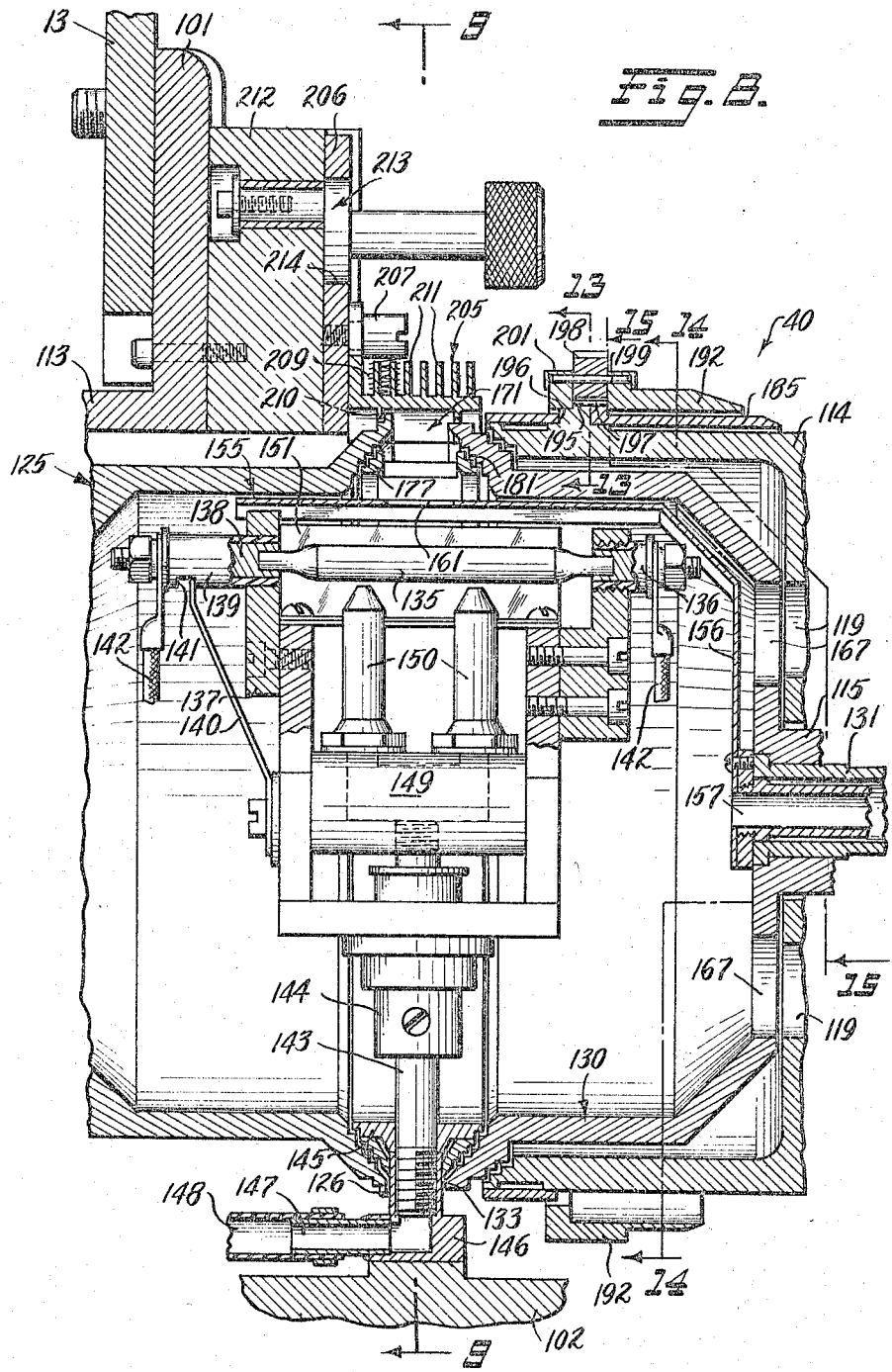

June 6, 1967 K. B. CURTIS 3,323,434
APPARATUS FOR SOUND AND IMAGE PRINTING OF
IRRADIATION SENSITIVE FILM
Filed Sept. 24, 1964 8 Sheets-Sheet 6
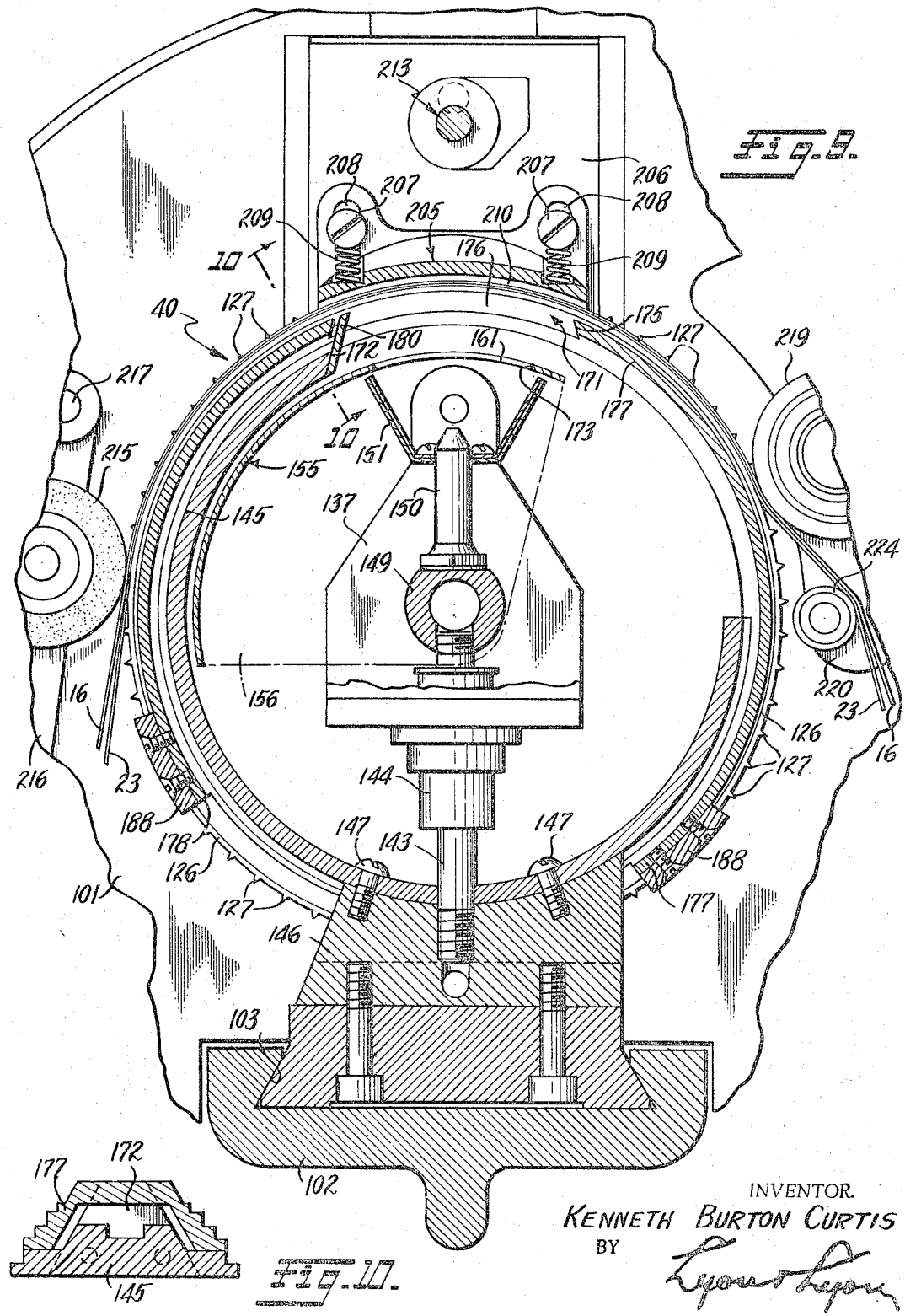
INVENTOR.
KENNETH BURTON CURTIS
BY
ATTORNEYS

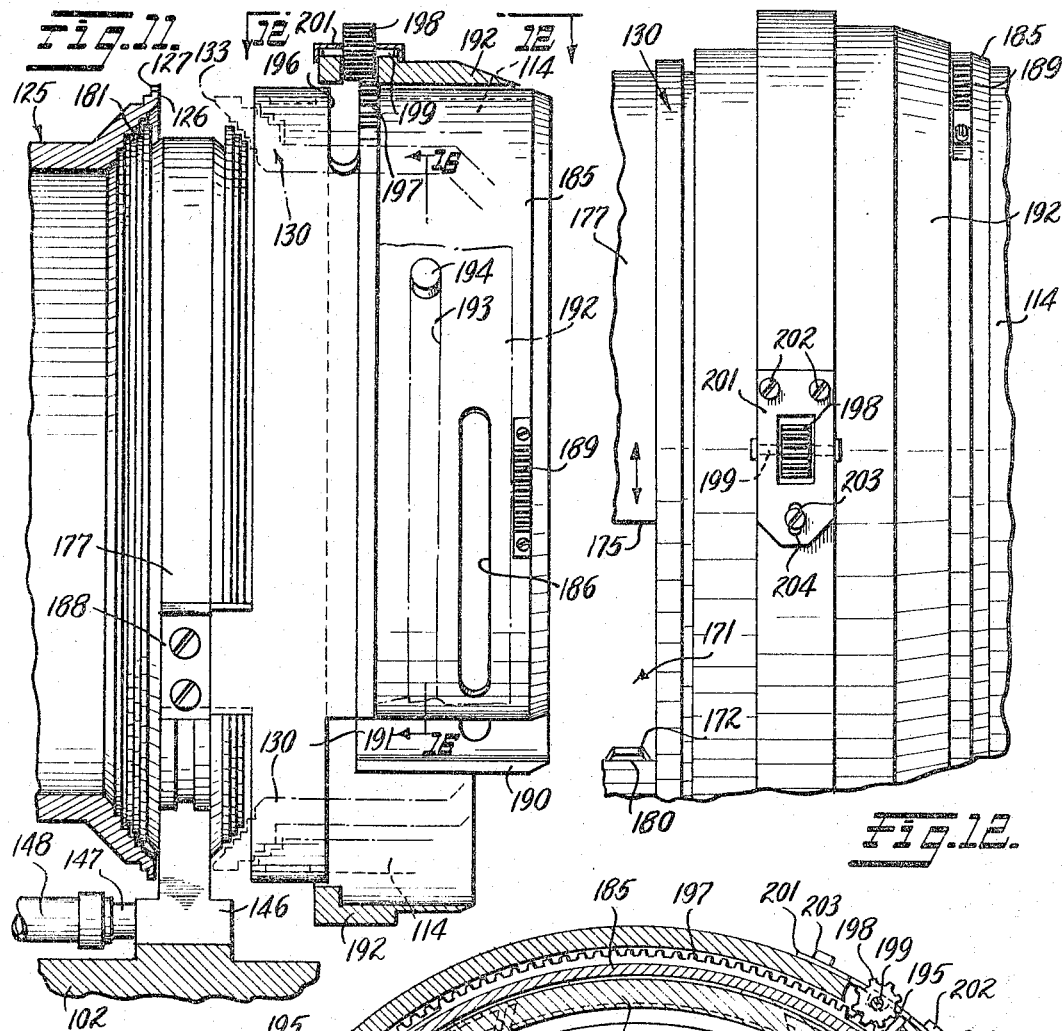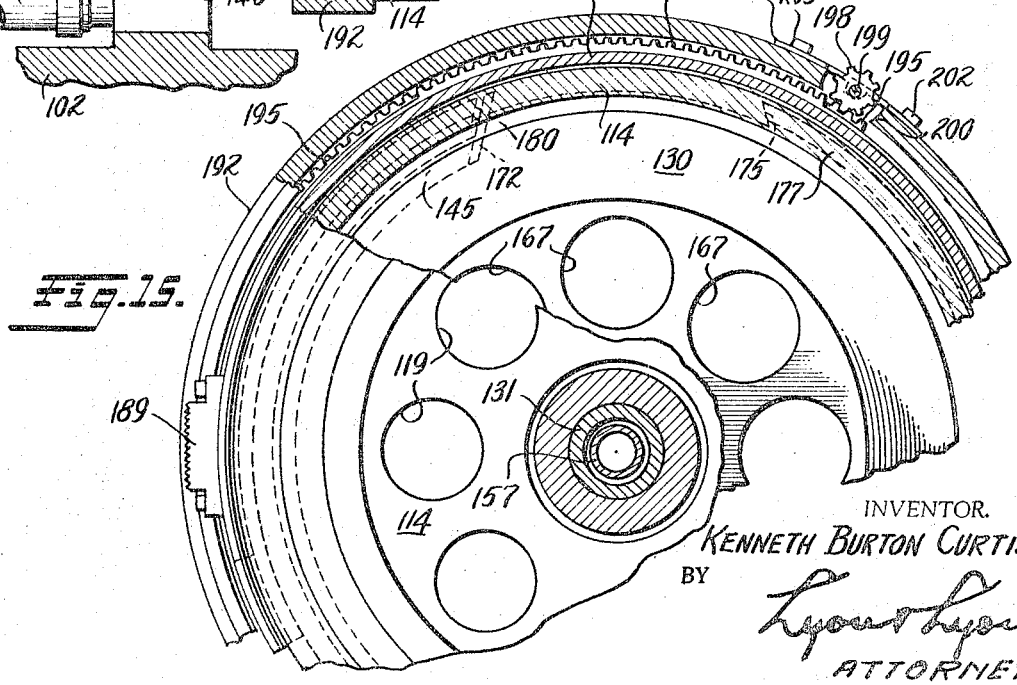

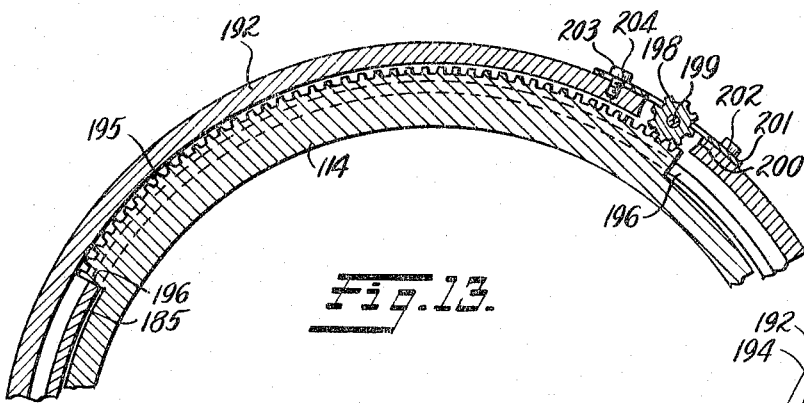
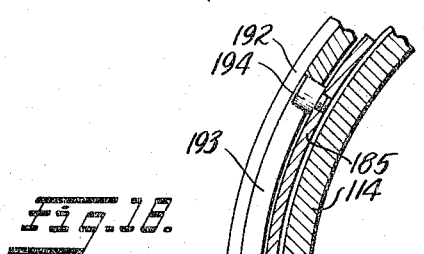
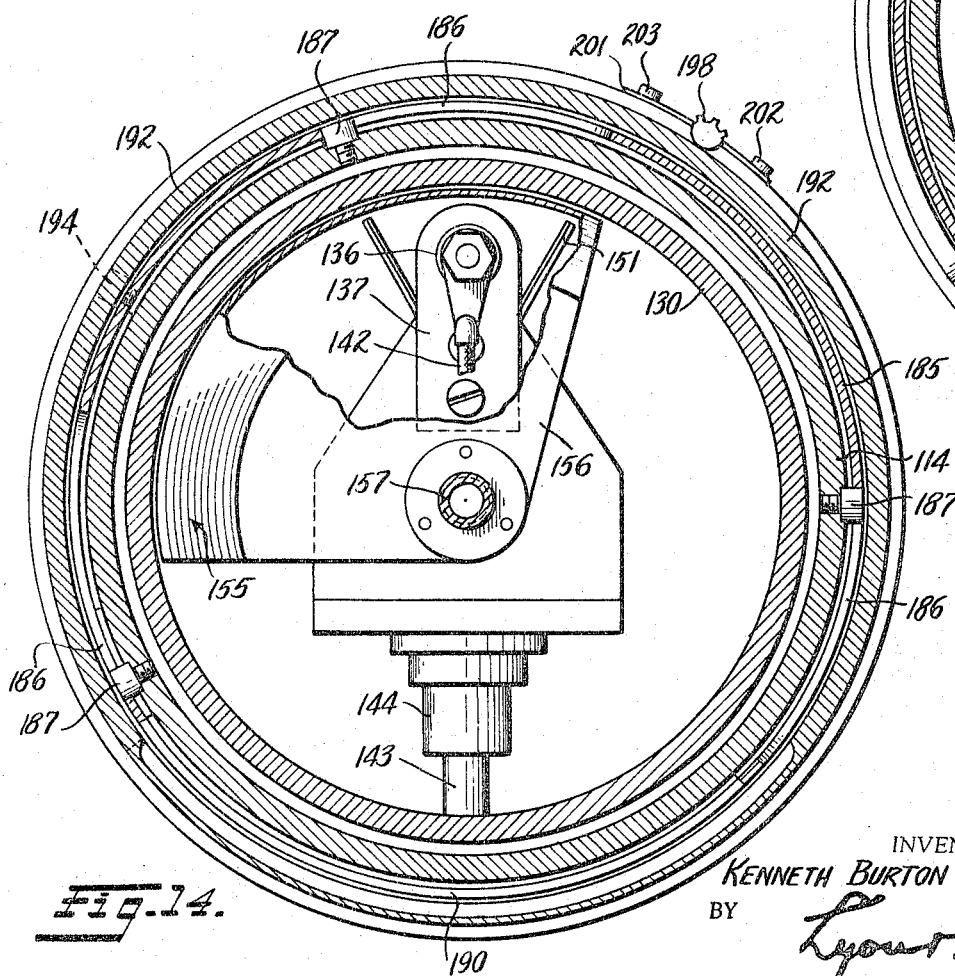

United States Patent Office 3,323,434
Patented June 6, 1967

3,323,434
APPARATUS FOR SOUND AND IMAGE PRINTING OF IRRADIATION SENSITIVE FILM
Kenneth Burton Curtis, Kansas City, Mo., assignor, by mesne assignments, to Metro-Kalvar, Inc., New York, N.Y., a corporation of Delaware
Filed Sept. 24, 1964, Ser. No. 399,028
13 Claims. (Cl. 95—75)

This invention relates to a printing and processing apparatus for motion picture film of the irradiation-sensitive and heat-developable type. This invention is particularly directed to such an apparatus for separating printing the image and sound portions from separate master negative films on a single web of this film which is also of the type that employs the concept of light scattering rather than light absorption of conventional silver halide films.

Although the theory of light scattering is well known and has been used in films, only recently have films been developed which have commercially acceptable characteristics. One major advantage of this improved film is that it may be printed, developed and fixed solely by the proper application of irradiation and heat. Some of the acceptable compositions of the film and the methods of producing and processing such film are described in greater detail in United States Letters Patent No. 2,911,299, for "System of Photographic Reproduction," inventors, Albert Baril Jr., Arvin H. De Barbieris, Robert T. Nieset, and Thornton Stearns, and in an article published in the "Journal of the Society of Motion Picture and Television Engineers," March 1964, page 213, entitled "A New Heat-Developable Motion-Picture Print Film," by Noel R. Bacon and Robert B. Lindemeyer.

The apparatus of this invention is particularly adapted to printing and processing the motion picture film described in the aforementioned article by Bacon and Lindemeyer, known in the industry under the trade designation "Kalvar vesicular film" and sold by the Kalvor Corporation, New Orleans. However it will readily appear to those skilled in the art that the apparatus of this invention may be readily adapted and adjusted to accommodate other films of the irradiation-sensitive and heat-developable type. Briefly the Kalvar vesicular film may be described as a transparent polyester base web having a thermo-plastic resin coating with an ultraviolet-sensitive compound uniformly dispersed within the resin. The film is relatively insensitive to ordinary levels of visible light but upon exposure to intense ultraviolet light, the dispersed compound (such as diazonium salt) is decomposed to release nitrogen to form microscopic vesicles upon heating to soften the thermo-plastic resin. The film is then "fixed" by irradiating under controlled conditions whereby the remaining ultraviolet-sensitive material is decomposed and the nitrogen or other volatile products produced are allowed to diffuse without creating light-scattered vesicles, whereby the film is then insensitive to further exposure to irradiating light. While this printing and processing is greatly simplified over the printing and processing procedures employed with silver halide films, it is still essential that various conditions and procedures be closely controlled and accurately accomplished in order to achieve the highest possible quality and consistency of the film print. Further, printers for conventional film employ a short exposure aperture which does not need to be adjustable in size, whereas the Kalvar vesicular film requires exposure through an aperture which is completely and accurately adjustable over a substantial range of sizes.

Accordingly, it is a principal object of this invention to provide a novel form of apparatus for printing and processing irradiation-sensitive and heat-developable motion picture film to include both image and sound portions.

Another object of this invention is to provide a novel form of apparatus for concurrently printing image and sound indicia from two separate master films on separate portions of an irradiation-sensitive film.

A further object of this invention is to provide a novel form of irradiation exposure or printing apparatus for rapidly and accurately exposing irradiation-sensitive film in correlation with a master film.

A still further object of this invention is to provide printing and processing apparatus having a novel form of exposure head with a substantially elongated, circumferential exposure aperture that is readily adjustable and wherein the film temperature and irradiation exposure are accurately controlled under high production rates.

Other and more detailed objects of this invention will appear from the following description and the accompanying drawings, wherein:

FIGURE 1 is an elevational view of the front of the apparatus of this invention.

FIGURE 4 is a sectional elevation of the picture image exposure head taken substantially on the line 4—4 of FIGURE 3.

FIGURE 5 is an enlarged fragmentary sectional elevation of the exposure aperture portion of the exposure head shown in FIGURE 4 and taken substantially on the line 5—5 of FIGURE 1.

FIGURE 6 is a view similar to FIGURE 5 but illustrating the exposed aperture portion of the sound exposure head of the apparatus and taken substantially on the line 6—6 of FIGURE 1.

FIGURE 7 is a fragmentary sectional view illustrating the sound exposure head of the apparatus and taken substantially on the line 7—7 of FIGURE 1.

FIGURE 8 is an enlarged fragmentary sectional elevation similar to FIGURE 4 but illustrating additional components in section for clarity.

FIGURE 9 is a sectional view taken substantially on the line 9—9 of FIGURE 8.

FIGURE 10 is a fragmentary sectional view of the exposure aperture ring stop taken substantially on the line 10—10 of FIGURE 9.

FIGURE 11 is a sectional elevation view similar to FIGURE 8 but with numerous components omitted and other components shown in dashed lines for clarity of illustration of the exposure aperture adjusting mechanism.

FIGURE 12 is a fragmentary plan view taken substantially on the line 12—12 of FIGURE 11.

FIGURES 13, 14, 15 and 16 are various sectional elevation views of the exposure aperture adjustment mechanism taken substantially on the respective lines 13—13 of FIGURE 8, 14—14 of FIGURE 8, 15—15 of FIGURE 8, and 16—16 of FIGURE 11.

Figure 2:
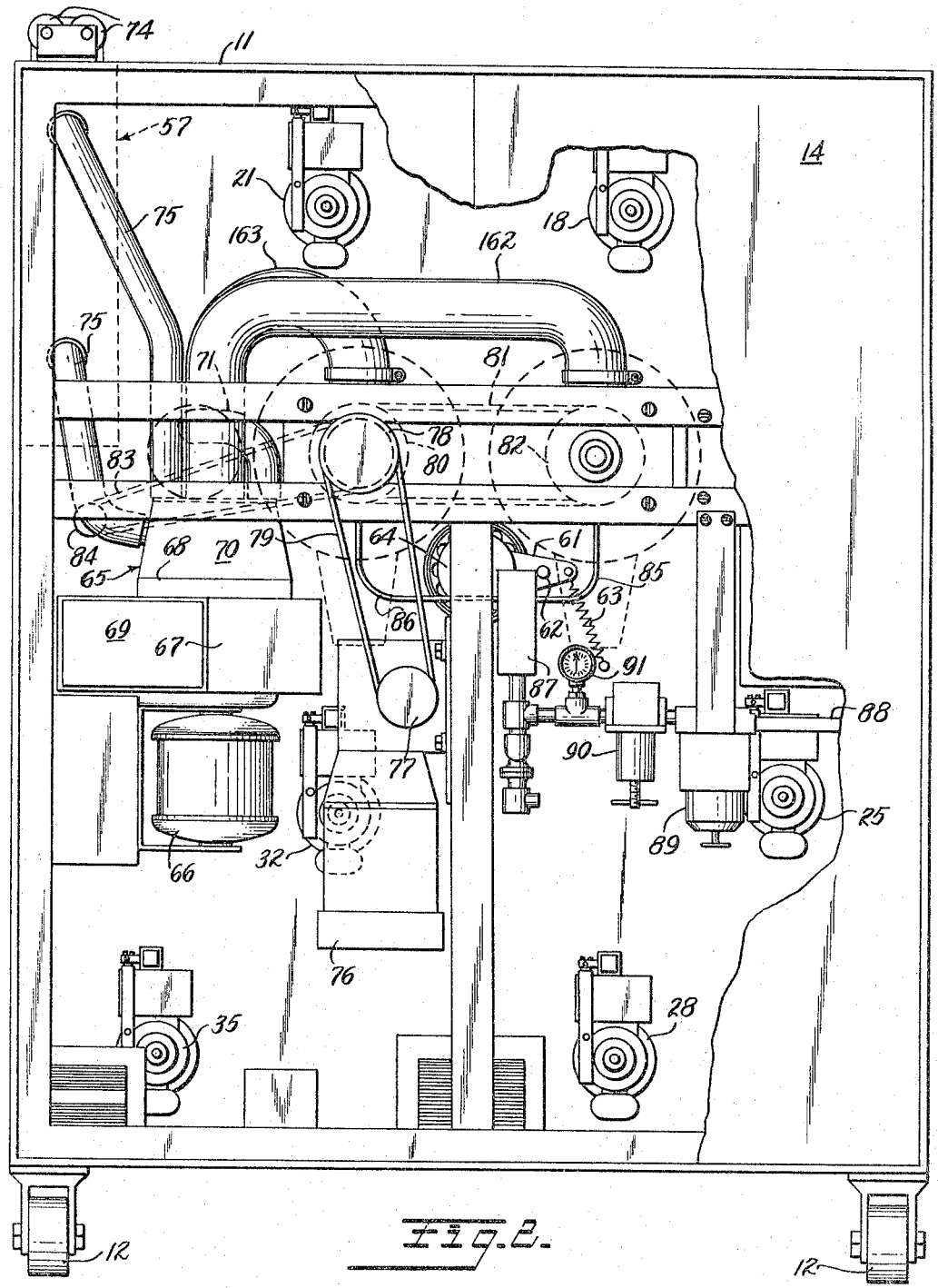
FIGURE 2 is an elevation view of the rear of the apparatus of this invention.
Figure 3:
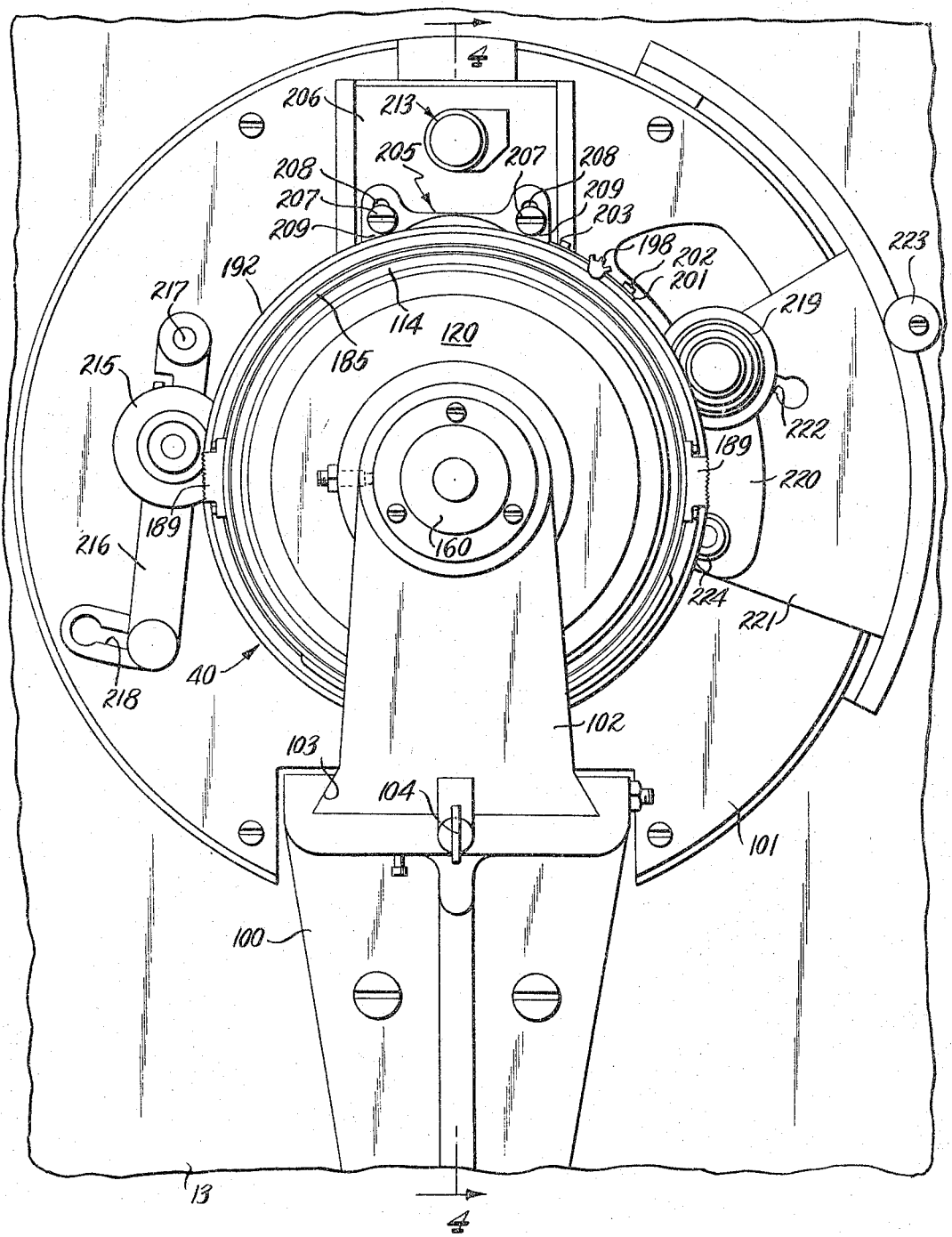
FIGURE 3 is an enlarged front elevation of an exposure head of the apparatus of this invention.

Referring now more particularly to FIGURES 1 and 2, the film printing and processing apparatus of this invention is generally designated 10 and includes a cabinet 11 which may be conveniently mounted on casters 12 for mobility of the apparatus. The various films are supported on and threaded through the appropriate components of the apparatus immediately in front of the front wall 13 of the cabinet 11. Various driving and control mechanisms are provided within the cabinet 11 and are accessible through doors 14 on the rear of the cabinet.

In FIGURE 1 the various rolls of film are illustrated in an intermediate condition of printing the entire film copy and moreover, for simplicity, the rolls are illustrated as completely unsupported although it is to be understood that each roll of film would actually be appropriately wound on a reel of any convenient type. The feed roll 15 of the raw stock of irradiation-sensitive and heat-developable film 16 is mounted on a spindle 17 extending through the front wall panel 13 from a torque motor 18. The film 16 is threaded through the apparatus in the hereafter described manner and to a take-up roll 19 which is mounted on the spindle 20 of another torque motor 21. The torque motors 18 and 21 may be of any conventional type and are adjusted to maintain a predetermined desired tension on the film 16 as it proceeds through the apparatus rather than driving such film through the apparatus at a particular rate. The rate of film travel is controlled by later-described components of the apparatus.

Similarly, the feed roll 22 of picture image film 23 is mounted on the spindle 24 of a torque motor 25. The film 23 is fed through the appropriate portion of the apparatus and to a take-up roll 26 mounted on the spindle 27 of another torque motor 28. Likewise, the feed roll 29 of sound track film 30 is mounted on the spindle 31 of torque motor 32 and the take-up roll 33 is mounted on the spindle 34 of torque motor 35. In this manner, the master film webs 23 and 30 for both image and sound are also drawn through the apparatus at preselected values of tension on the film webs applied by the feed and take-up roll torque motors, whereby the rate of film travel may be determined and adjusted by other components of the apparatus. As will hereinafter appear more fully, the films are positively fed through the apparatus by sprocket tooth engagement with the marginal perforations on the film and therefore, the torque values exerted by the various torque motors may each be individually adjusted to achieve the best results.

The master web of film 23 containing image indicia is fed from roll 22 through a snubber roller assembly 36 which is comprised of a pair of spaced rollers rotatably mounted on a pivot arm that is spring biased in a direction for absorbing any sudden tension or shock applied to the film. The film 23 is then passed over an idler roller 37 and upwardly to and over the exposure head, generally designated 40. The film 23 is then threaded from exposure head 40 through a separate snubber roller assembly 41 to the take-up roll 26. The master web of sound film 30 containing the sound indicia is fed from roll 29 over an idler roller 42, through a snubber assembly 43 and over an idler roller 44 to the sound exposure head, generally designated 45. From exposure head 45, the film 30 is threaded through another snubber roller assembly 46 to the take-up roll 33.

The raw stock of film 16 is fed from roll 15 through a snubber roller assembly 47 to an idler roller 48 positioned near feed idler roller 37 for the image master film 23 and then to the image master film 23. A "tightwind" roller assembly 38 is provided adjacent roll 15 for selectively engaging roll 15 to assure smooth film travel. Assembly 38 may be held in a retracted position (as shown) by a magnet 39. The film 16 is threaded from image exposure head 40 over a rotatable cooling roller 50 to the sound exposure head 45 in superimposed relation upon the sound master film 30. The cooling roller 50 serves to reduce the film temperature from the elevated level caused by exposure head 40 to a safe level whereby the additional heating by exposure head 45 will not be compounded to achieve an undesirable and uncontrolled temperature level. The exposure heads 40 and 45 have hereinafter described means which serve to irradiate the film 16 in correlation to the indicia on the separate master films 23 and 30 and at separate lateral portions of the film 16.

The film 16 is then passed over an idler roller 51 to a rotatably mounted heating roll 52 for controlled heating of the film 16 to the proper temperature for developing such film by softening the thermo-plastic resin to permit formation of the microscopic vesicles in the areas of irradiation. The film 16 is then fed over another cooling roller 53 to reduce the film temperature to a level at which the thermoplastic resin will not permit formation of further vesicles upon decomposition of the remaining irradiation-sensitive compound. Then the film 16 is passed over a tension roller assembly 54 to an auxiliary sprocket 55 which engages the perforations of the film. From sprocket 55 the film is passed over an idler roller 56 and then through a film "fixing" assembly 57 where the entire film is irradiated under controlled conditions to completely desensitize the film. From film fixing assembly 57 the film 16 is fed over an idler roller 58 through another snubber roller assembly 59 to the take-up roll 19. Except for permitting ordered diffusion of gases by avoiding elevated temperatures for a few hours, the film in role 19 is a completed image and sound film print which will be in the form of a "positive" film if the master films 23 and 30 are "negative."

The cooling roller 50 may be comprised of a heat conductive drum having ports 60 on the end for the passage of cooling air. The drum or roller 50 is rotatably mounted on an arm 61 which is in turn pivotally mounted at 62 on wall 13 whereby the roller 50 may swing upwardly and downwardly a limited distance for accommodating small changes in the length of the film 16 between the exposure heads 40 and 45. A counterbalancing spring 63 biases the pivot arm 61 the desired amount for avoiding excessive tensioning of the film 16. A small blower fan 64 is also mounted on pivot arm 61 directly behind roller 50 for causing a substantial and continuous flow of cooling air through the roller.

The heating roll 52 may be of any convenient type and construction whereby the surface temperature is closely controllable to assure the proper developing of the film 16. In this regard an internally mounted resistance heating coil has been found satisfactory when controlled in the conventional manner by means of a variable current input.

The cooling roller 53 and the film fixing assembly 57 are both cooled by a central air suction assembly, generally designated 65, which also serves to cool the exposure heads 40 and 45 in a manner hereinafter described. Assembly 65 includes a motor 66 for driving a blower 67 which has an inlet 68 and an outlet 69. A manifold 70 is connected to inlet 68 of the blower. A suction hose 71 is connected from immediately behind the cooling roller 53 to the manifold 70 for drawing cooling air through roller 53. Roller 53 may be appropriately sleeved, ported and/or finned in any convenient manner for efficiently using the air drawn through suction hose 71 to cool the surface of roller 53.

The film fixing assembly 57 includes an enclosing housing 72 which is open at the upper and lower ends for accommodating the entrance and exit of the film 16. An elongated lamp 73 of a type (such as an ultraviolet lamp) which produces the necessary decomposing irradiation is mounted lengthwise in the housing 72 for maximum exposure to the film. A pair of idler rollers 74 are positioned above housing 72 for reversing the direction of upward film travel down through the housing to idler roller 58. A pair of suction hoses 75 are connected from the back side of housing 72 to the suction manifold 70 of blower 67 whereby continuous cool air circulation through housing 72 is maintained to both cool the lamp 73 and maintain the film 16 at a temperature below the level at which the thermo-plastic resin softens to permit formation of vesicles upon decomposition of the irradiation sensitive compounds.

A variable speed drive motor 76 drives a sheave 77 which in turn drives a sheave 78 through a belt 79. Sheave 78 is mounted on the rearwardmost end of the drive shaft of exposure head 45. A second sheave 80 is mounted on the same drive shaft and serves to rotate the drive shaft of exposure head 40 at the same speed through a belt 81 and equal diameter sheave 82. Still another sheave (not visible) is mounted on the drive shaft of exposure head 45 and drives the auxiliary sprocket 55 through belt 83 and sheave 84. The sizes of these sheaves are appropriately adjusted with respect to these sprocket sizes whereby the exposure heads 40 and 45 and auxiliary sprocket 55 all drive the film at the same linear rate. The actual film driving means of exposure heads 40 and 45 will be described in further detail.

As will appear hereinafter, the exposure heads 40 and 45 employ pressurized air and this air is supplied through tubes 85 and 86, respectively, from manifold 87. A pressurized air supply line 88 is connected through a filter-dryer 89 and pressure regulator 90 to the manifold 87 whereby the air supplied to the exposure heads is both clean and properly pressurized. A gauge 91 may be provided for visual observance of the proper air pressure.

The exposure heads 40 and 45 are substantially identical in most respects with the image exposure head 40 being slightly more complex than the sound exposure head 45. Thus the image exposure head 40 will be described in detail as illustrated in FIGURES 3, 4, 5 and 8 through 16. The differences in the sound exposure head 45 are observable and then will be described by reference to FIGURES 6 and 7.

Each exposure head includes a support bracket 100 mounted on the front wall 13 of the cabinet and extending both forwardly and rearwardly of the wall. A mounting flange 101 is also mounted on the front wall 13 for supporting and accommodating various components and accessories of the exposure head. A frame 102 mates with and is slidably supported in a dove-tail slot 103 in the support bracket 100. An adjustable and releasable latch 104 is mounted in bracket 100 for engaging the front surface of frame 102 to lock the frame in the desired position. An adjustable stop 105 is provided at the rear of bracket 100 for engaging the rear end of frame 102 whereby the frame 102 is accurately located relative to the other components. A spring loaded pivot-dog 106 is mounted near the front of bracket 100 for engaging a notch 107 on the bottom of frame 102 upon forward sliding of frame 102 whereby inadvertent complete removal of the frame is avoided. If it is then desired to completely remove the frame 102 from the apparatus, the dog 106 may be pivoted downwardly to a released position.

A spindle frame 108 is fixedly mounted on the rear of bracket 100. Spaced bearings 109 and 110 are mounted in the spindle frame 108 for rotatably supporting the drive shaft 111 of the exposure head. Various collars and shoulders are provided on the drive shaft 111 for engaging the bearings 109 and 110 to prohibit axial movement of the drive shaft. It is to be recalled that the drive shaft 111 of exposure head 40 supports the sheave 82 and is driven by the belt 81. The similar drive shaft of exposure head 45 supports the sheaves 78 and 80 and is driven by the belt 79. The front portion 112 of spindle frame 108 mates with and is attached to the collar portion 113 of the mounting flange 101. A drum shaped housing 114 is mounted on the front portion of frame 102 by means of a tubular extension portion 115 positioned in a bore 116 in the frame 102 which is aligned with the drive shaft 111. A threaded collar 117 serves to lock the housing 114 to the frame 102. The housing 114 has a cylindrical drum portion 118 extending rearwardly toward wall 13. The front portion of housing 114 is provided with a plurality of ports 119 for accommodating air circulation and these ports are covered by a closely spaced flange plate 120. Flange plate 120 and housing 114 have mating and spaced stepped portions 121 which permit airflow therebetween to the ports 119 but prohibit the passage of irradiating light.

A drum 125 is mounted on drive shaft 111 for rotation therewith and extends forwardly to and terminates in an open front edge 126. The extreme periphery of edge 126 is provided with a plurality of sprocket teeth 127 adapted to engage the marginal perforations 128 of the film webs 16, 23 and 30 as shown in FIGURES 5 and 6.

Another drum 130 is mounted on a tubular shaft 131 which is in turn rotatably mounted by bearings 132 within the tubular portion 115 of housing 114. Drum 130 terminates in an open edge portion 133 appropriately spaced from the extremity of edge 126 of drum 125 for accommodating the image portion of the image master film 23 between the edges. The edge 133 is provided with a cylindrical outer surface 134 for supporting a large marginal portion of the film 23. In this manner the films 23 and 16 are supported at both margins by the drums 125 and 130 with drum 125 being power driven while drum 130 is merely permitted to rotate with the film to minimize friction and abrasion. The edge portion 133 of drum 130 also serves as a shield for preventing irradiation of the marginal portion of film 16 that subsequently will be irradiated at exposure head 45 to print the sound indicia.

Means are provided within the drums of the exposure heads 40 and 45 for producing a source of irradiation for exposing and thereby printing the irradiation sensitive film 16 and, as shown in the drawings, these means may include a mercury vapor lamp 135 positioned immediately below the upper portions of the drums 125 and 130. One electrical socket 136 for the lamp 135 is mounted in and insulated from a housing 137. A second electrical socket 138 is mounted in an insulating sleeve 139 which is turn is slidably mounted in the other side of housing 137. A spring latch 140 engages a notch 141 in sleeve 139 to removably retain the mercury vapor lamp 135 in operative position. The electrical current to operate the lamp 135 is provided through leads 142. The housing 137 is mounted on a tube 143 by means of a collar 144. Tube 143 passes through ring segment 145 and is threadedly connected to a block 146 which is in turn mounted on the frame 102. The tube 143 and block 146 are positioned between the edges 126 and 133 of the drums 125 and 130. Block 146 is appropriately ported and connected through a fitting 147 to a flexible hose 148 which is in turn connected to the previously described pressurized air tube 85. The upper end of tube 143 is connected to another ported block 149 which supports a pair of nozzles 150 immediately below the lamp 135. Thus, a continuous supply of pressurized air is impinged upon lamp 135 to cool the lamp and minimize the heating effect on the films. A trough shaped reflector 151 is positioned around lamp 135 to concentrate the irradiating ultraviolet light rays in the upward direction. It is to be noted that replacement or maintenance of the lamp 135 may be accomplished by releasing the latch 104 and moving the slide frame 102 forward to separate drum 130 from drum 125 to provide access to the lamp. By sliding the insulating sleeve 139 rearwardly in opposition to the spring 140, the end of the lamp 135 will be released.

In order to permit selective exposure or non-exposure of the film to the lamp 135 without switching such lamp on and off, a "dowser" or visor 155 is movably mounted between the lamp 135 and the inside of the drums 125 and 130. Visor 155 is in the form of a cylindrical segment of slightly more than 90 degrees and has a radial flange 156 on the front end. Flange 156 is connected to a tube 157 which is in turn rotatably mounted within the tubular shaft 131. A fitting 158 connects the end of shaft 157 to a rotary solenoid mechanism 159 mounted in a closure cap 160 which is in turn mounted on collar 117. Upon actuation of solenoid 159, the shaft 157 is pivoted to in turn pivot visor 155 between open and closed positions wherein the lamp 135 is exposed or covered, respectively. The major portion of the cylindrical segment of visor 155 is impervious but an elongated aperture 161 is provided in one portion for permitting the passage of light rays from the lamp 135 to the films. Thus even in the "open"

position of visor 155, the emission of stray light rays from lamp 135 is limited by the size of aperture 161 which is in turn limited only to that size which is necessary to obtain full exposure of the film.

In addition to the cooling effect of the airjet nozzles 150, the entire exposure head is air cooled by drawing air therethrough by means of the air suction assembly 65. Vacuum hoses 162 and 163 are connected from the spindle frames 108 of the exposure heads 40 and 45, respectively, to the intake manifold 70 of the blower 67. Each spindle frame 108 has an internal chamber 164 ported at 165 adjacent the ports 166 in rotating drum 125 whereby air is continually drawn from within and around drum 125 to affect the desired cooling. Drum 130 is provided with ports 167 adjacent the ports 119 in housing 114 whereby fresh air is continually admitted to the inside of the drum. Ports 168 are also provided in closure cap 160 for permitting fresh air to be drawn through that portion of the assembly.

Means are provided for adjusting the quantity of irradiation to which the film will be subjected and, as shown in the drawings, these means may include the exposure aperture adjustment mechanism generally designated 170. Since the films 16 and 23 are traveling over the exposure head 40 at a given rate as determined by the rate of rotation of sprocket drum 125, the quantity or magnitude of irradiation is adjusted by varying the cirmuferential length of the exposure aperture 171. Laterally the exposure aperture 171 is defined by the extreme edges of drums 125 and 130. Circumferentially the exposure aperture 171 is defined at one end by the fixed stop 172 and the end 173 of the visor aperture 161. Stop 172 is mounted on one extreme circumferential end of the segment ring 145 which in turn is fixedly mounted on block 146 by screws 174. the other circumferential extremity of exposure aperture 171 is defined by the edge 175 of a curcumferential slot 176 in a circular exposure ring 177. Exposure ring 177 is provided with a second slot 178 for surrounding block 146. Ring 177 is slidably mounted on the exterior of segment ring 145 for circumferential rotation of ring 177. The exposure ring 177 is rotated in a manner hereafter described to move the edge 175 toward and away from the stop 172 thereby varying the size of the exposure aperture. Approximately the maximum size of aperture 171 is illustrated in FIGURE 9, since the edge 180 of slot 176 is nearly in engagement with stop 172. The exposure ring 177 is provided with stepped external surfaces 181 adjacent to and mating with like stepped surfaces of the drums 125 and 130 whereby irradiating light rays are not permitted to pass therebetween but sufficient space is provided for permitting airflow therebetween and relative rotation.

The exposure aperture adjustment mechanism 170 includes a sleeve 185 rotatably mounted on the housing 114 and which has three circumferential slots 186 adapted to engage the heads of guide bolts 187 attached to housing 114 for limiting and guiding both the circumferential and axial movement of sleeve 185. A pair of axial extensions 188 on sleeve 185 are bolted to the exposure ring 177. A pair of finger grips 189 are provided on the front edge of sleeve 185 for facilitating approximate circumferential adjustment of exposure ring 177 by rotating sleeve 185 to provide the appropriate exposure aperture 171. It is to be noted that the front portion of sleeve 185 is discontinuous at 190 and only completely encircles the housing 114 by the portion 191. A second sleeve 192 encircles sleeve 185 and is maintained in accurate circumferential and axial alignment therewith by means of circumferential slots 193 in sleeve 192 engaging the heads of guide bolts 194 secured to sleeve 185. The housing 114 is provided with a segment 195 of spur gear teeth which protrude through a slot 196 provided in sleeve 185. Sleeve 185 is provided with a segment 197 of spur gear teeth positioned immediately adjacent the gear segment 195. A spur gear 198 is mounted on a pin 199 which is resiliently held within a trough 200 in sleeve 192 by a spring clip 201. Clip 201 is rigidly attached at one end by screws 202 and slidably attached at the other end by a screw 203 and a slot 204. By this arrangement if the spur gear 198 does not immediately mesh with a gear segment 195 or 197 upon approaching same, then the gear may spring outwardly until the meshing relationship is achieved. For simplicity the gear segments 195 and 197 have been illustrated as having identical tooth profiles, but in fact the segment 197 is provided with a slightly greater number of teeth than segment 195 for a given circumferential distance. In other words, the spacing between teeth of segment 197 is slightly smaller than that of segment 195. For example, it has been found that the tooth profiles of the two segments should be such that if complete circular gears were cut when the gear of segment 195 would possess one hundred and eighty-nine teeth whereas the gear of segment 197 would possess one hundred and ninety-five teeth. The pinion spur gear 198 is of a size and configuration to accommodate both tooth profiles. Thus, for fine adjustments of the size of aperture 171 the sleeve 192 is rotated to cause engagement of the spur gear 198 with the gear segments 195 and 197. Since the gear segment 195 is on the fixed housing 114 the rotation of sleeve 192 in a given direction will also cause minute rotation of sleeve 185 in that same direction by reason of the "rolling" rotation of gear 198 and the smaller distance between the teeth of segment 197. This provides a convenient means for rapidly and precisely adjusting the aperture opening 171 to achieve the optimum exposure.

The marginal portions of master film web 23 ride directly upon the sprocket drum 125 and the free-rotating drum 130 and the sensitized film 13 is superimposed thereon as the two films are drawn over the exposure head by the sprocket teeth 127 of drum 125. A shoe 205 is slidably mounted on a block 206 by means of bolts 207 passing through vertical slots 208 in the shoe. Springs 209 extend between bolts 207 and the shoe 205 for resiliently urging the shoe downwardly against the film. Shoe 205 is provided with a pair of arcuate ridges 210 for engaging the marginal portions of the film whereby the film is firmly urged against the drums 125 and 130. The shoe 205 is provided with fins 211 for convection cooling. The block 206 is slidably mounted on a block 212 which is in turn mounted on the flange 101. An eccentric cam mechanism 213 is rotatably mounted in block 212 and engages an aperture 214 in the block 206 whereby pivoting of the cam 213 causes raising and lowering of the block 206 to in turn raise and lower the shoe 205. This permits ready loading and examination of the film as desired.

A composition roller 215 is rotatably mounted on an arm 216 for engaging the film being fed onto the exposure head to assure firm contact between the two films and with the drums. Arm 216 is pivotally mounted at 217 and guided in a slot 218 for retracting the roller 215 for film loading. A second follower roller 219 is rotatably mounted on a pivot arm 220 for assuring firm contact between the films and with the drums well beyond the point of exposure and until the films are to be separated from the drums. Arm 220 is pivotally mounted on segment plate 221 for pivoting the roller 219 outwardly in the slot 222 for loading film. Plate 221 is adapted to be moved circumferentially on flange 101 and locked in the desired position by eccentric cam lock 223 in order to move the roller 219 circumferentially around the exposure head to the optimum position. In this respect it has been found that cerain film conditions, most noticeably the spacing between marginal perforations, require that the roller 219 be moved circumferentially toward or away from the exposure aperture to achieve the best results. An idler roller 224 serves to separate the films from the exposure head drums.

Now referring in further detail to FIGURES 6 and 7 wherein the modifications found in exposure head 45 are illustrated, it is first to be noted that the free rotating drum 130 may be omitted since most of the film is supported on drum 125. The drum 125 is provided with an edge extension ring 225 which completely supports and shields the previously exposed image portion of the film. The exposure ring 177 is also omitted and in its place the sleeve 185a, extends outwardly into overlapping relation with the drum extension ring 225. An aperture slot 176a is provided in sleeve 185a to fulfill the same function as the aperture slot 176 that is provided in exposure ring 177. In all other respects the sleeve 185a is the same as sleeve 185. The housing 114a extends into overlapping relationship with the spacer 225 and is provided with an exposure aperture 226. In all other respects, the housing 114a is identical to housing 114. The housing 114a and sleeve 185a are provided with stepped edge portions for cooperating with drum extension ring 225 to prohibit the escape of light rays. The visor 155 is provided with a narrower elongated aperture 161 since only the marginal portion of the film is to be exposed. The circumferential length of the exposure aperture is again adjusted by circumferentially adjusting the sleeve 185a and the fine adjustments thereof are accomplished by the rotation of sleeve 192 and the meshing of gear 198 with the unequal gear segments.

Thus it may be seen that an apparatus is provided for processing irradiation-sensitive and heat-developable film under precisely controlled conditions at production rates whereby an optimum quality of print is obtained. Having fully described the invention, it is to be understood that such invention is not to be limited to the details herein set forth or to the details illustrated in the drawings but rather such invention is of the full scope of the appended claims.

I claim:

1. An apparatus for reproducing both image and sound indicia on an irradiation sensitive and heat developable web from separate master webs having such image indicia and sound indicia, comprising: separate pairs of feed and take-up rolls for the irradiation sensitive web and the two master webs, a pair of exposure heads having means for irradiating a web, means for feeding the irradiation sensitive web successively to each said exposure head, means for cooling the irradiation sensitive web after feeding into one exposure head and before feeding to the other exposure head for maintaining the temperature of the web below the heat developable temperature, means for feeding the image master web to and from one said exposure head, means for feeding the sound master web to and from the other said exposure head, each said exposure head having means for synchronously driving the irradiation sensitive web and a master web in superimposed relation past said irradiating means for irradiating said sensitive web in correlation to the indicia on that master web, means for heating the irradiated web for developing the web, and means for irradiating the web under controlled temperature conditions for desensitizing the web.

2. An apparatus for reproducing both image and sound indicia on an irradiation sensitive web from separate master webs having such image indicia and sound indicia, comprising: a par of exposure heads having means for irradiating a web, means for feeding the irradiation sensitive web successively to each said exposure head, means for rapidly cooling the irradiation sensitive web to below the heat developable temperature as the web is fed from one exposure head to the other, means for feeding the image said exposure head, each said exposure head having means for feeding the sound master web to and from the other said exposure head, each said exposure head having means for accommodating and synchronously moving a master web and superimposed irradiation sensitive web therethrough for irradiating said sensitive web in correlation to the indicia on that master web, means for developing the irradiated web, and means for irradiating the irradiated and developed web under controlled conditions for desensitizing the web.

3. An apparatus for reproducing both image and sound indicia on an irradiation sensitive web from separate master webs having such image indicia and sound indicia, comprising: a pair of exposure heads having means for irradiating a web, means for feeding the irradiation sensitive web successively to each said exposure head, a cooling drum rotatably mounted and having the irradiation sensitive web passing thereover in heat transfer surface contact as the web is fed from one said exposure head to the other said exposure head to maintain the web temperature below the heat developing level, means for feeding the image master web to and from one said exposure head, means for feeding the sound master web to and from the other said exposure head, each said exposure head having means for driving the irradiation sensitive web and a master web in superimposed relation past said irradiating means for irradiating said sensitive web in correlation to the indicia on that master web, each said exposure head having means for confining the exposure of irradiation solely to the portion of the master web which contains indicia, means for heating the irradiated web for developing the web, and means for irradiating the developed web under controlled temperature conditions for desensitizing the web from any further irradiation effects.

4. An apparatus for reproducing both image and sound indicia on an irradiation sensitive and heat developable web from separate master webs having such image indicia and sound indicia, comprising: separate pairs of feed and take-up rolls for the irradiation sensitive web and the two master webs, a separate torque motor driving each said roll for maintaining a predetermined tension on each of the webs, a pair of exposure heads having means for irradiating a web, means for feeding the irradiation sensitive web successively to each said exposure head, means for feeding the image master web to and from one said exposure head and then to the take-up roll, means for feeding the sound master web to and from the other said exposure head and then to the take-up roll, each said exposure head having means for engaging and driving the irradiation sensitive web and a master web in superimposed relation past said irradiating means for irradiating said sensitive web in correlation to the indicia on that master web, each said exposure head having means for confining the exposure of irradiation to the portion of the master web which contains indicia, means for cooling the irradiation sensitive web as the web is fed from one exposure head to the other exposure head to prevent premature heat developing of the web, means for heating the irradiated web for developing the web, and means for irradiating the irradiated web under controlled temperature conditions for desensitizing the web.

5. An apparatus for reproducing both image and sound indicia on an irradiation sensitive and heat-developable web from separate master webs having such image indicia and sound indicia, comprising: a pair of exposure heads having means for irradiating a web, means for feeding the irradiation sensitive web successively to each said exposure head, means for feeding the image master web to and from one said exposure head, means for feeding the sound master web to and from the other said exposure head, each said exposure head having means for driving the irradiation sensitive web and a master web in superimposed relation past said irradiating means for irradiating said senstive web in correlation to the indicia on that master web, means for cooling the irradiation sensitive web between said two exposure heads for maintaining the web below the heat developable temperature, means for heating the irradiated web for developing the web, means for cooling the developed web below the heat developable temperature, and means for irradiating the irradiated and developed web under controlled heat and intensity conditions for desensitizing the web.

6. An apparatus for reproducing both image and sound indicia on an irradiation sensitive and heat developable web from separate master webs having such image indicia and sound indicia, comprising: separate pairs of feed and take-up rolls for the irradiation sensitive web and the two master webs, a separate torque motor driving each said roll for maintaining a predetermined tension on each of the webs, a pair of exposure heads having means for irradiating a web, means for feeding the irradiation sensitive web successively to each said exposure head, means for feeding the image master web from the feed roll to one said exposure head and then to the take-up roll, means for feeding the sound master web from the feed roll to the other said exposure head and then to the take-up roll, each said exposure head having means for driving the irradiation senstive web and a master web in superimposed relation past said irradiating means for irradiating said sensitive web in correlation to the indicia on that master web, means for cooling the irradiation sensitive web between said two exposure heads, each said exposure head having means for confining the exposure of irradiation to the portion of the master web which contains indicia, means for heating the irradiated web for developing the web, means for cooling the web below the developable temperature, means for pulling the irradiation sensitive web through the apparatus at the same rate as the said exposure head driving means passes the webs past the irradiating means, and means for irradiating the irradiated and developed web under controlled temperature and intensity conditions for desensitizing the web from any further irradiation effects.

7. An apparatus for reproducing both image and sound indicia on an irradiation sensitive and heat developable web from separate master webs having such image indicia and sound indicia, comprising: a pair of exposure heads having means for irradiating a web, means for feeding the irradiation sensitive web successively to each said exposure head, means for rapidly cooling the irradiation sensitive web feeding between said two exposure heads to prevent the web from reaching developing temperature as the web passes the second exposure head, means for feeding the image master web to and from one said exposure head, means for feeding the sound master web to and from the other said exposure head, each said exposure head having a drum with an open edge and sprocket teeth for engaging the marginal perforations on superimposd master and irradiation sensitive webs with the webs extending beyond said edge, means for rotating said drum for driving the film over that said exposure head, an exposure ring mounted adjacent said drum and having a circumferentially extending exposure aperture, an irradiation source means mounted within said drum and exposure ring, means for adjusting said exposure ring circumferentially for positioning a selected proportion of said exposure aperture in communication with said irradiation source means for irradiating the webs through that selected circumferential distance, means for heating the irradiated web for developing the web, and means for irradiating the irradiated and developed web under controlled temperature conditions for desensitizing that web.

8. An apparatus for reproducing both image and sound indicia on an irradiation sensitive and heat developable web from separate master webs having such image indicia and sound indicia, comprising: a pair of exposure heads having means for irradiating a web, means for feeding the irradiation sensitive web successively to each said exposure head, means for feeding the image master web to and from one said exposure head, means for feeding the sound master web to and from the other said exposure head, each said exposure head having a drum with sprocket teeth on an edge for engaging the marginal perforations on superimposed master and irradiation sensitive webs with the webs extending beyond said edge, means for rotating said drum for driving the webs over the drum, the exposure head associated with the image master web having a second drum rotatably mounted in alignment with said first drum and a smooth edge spaced from said toothed edge for supporting the opposite marginal portion of the webs, an exposure ring mounted adjacent said toothed drum and having a circumferentially extending exposure aperture, an irradiation source means mounted within said drum and exposure ring, a visor pivotally mounted within said drums and selectively movable between positions covering and exposing said irradiation source means, means for adjusting said exposure ring circumferentially for positioning a selected proportion of said exposure aperture in communication with said irradiation source means for irradiating the webs through that selected circumferential distance, means for circulating air through said drums and around the irradiation source means for maintaining the webs relatively cool, means for cooling the irradiation sensitive web between said two exposure heads, means for heating the irradiated web for developing the web, and means for irradiating the irradiated and developed web under controlled heat and intensity conditions for desensitizing that web from the effects of any further irradiation.

9. In an apparatus for intense and controlled irradiating of a continuous irradiation sensitive web having marginal perforations and in correlation with the indicia on a superimposed master web having marginal perforations, the combination of: a first drum having an open edge with sprocket teeth for engaging the marginal perforations on the webs with the webs extending beyond said edge, means for rotating said drum for advancing the webs over the apparatus at a predetermined rate, a second drum rotatably mounted in alignment with said first drum and having a smooth open edge spaced from said toothed edge for supporting and shielding the opposite marginal portion of the webs, an exposure ring mounted between the drum edges and within said drums and having a circumferentially extending exposure aperture, said exposure ring and said drums having spaced mating surfaces for preventing radiation from passing therebetween, an irradiation source means mounted entirely within said drums and exposure ring, a visor pivotally mounted within said drums between said irradiation source means and said exposure ring and said visor selectively movable between positions covering and exposing said irradiation source means to the said exposure aperture of said exposure ring, means for adjusting said exposure ring circumferentially for positioning a selected proportion of said exposure aperture in communication with said irradiation source means for irradiating the webs through that selected circumferential distance, and means for circulating air through said drums and around the irradiation source means for maintaining the webs relatively cool.

10. In an apparatus for intense and controlled condition irradiating of a continuous irradiation sensitive web having marginal perforations and in correlation with the indicia on a superimposed master web having marginal perforation, the combination of: a first drum having an open edge with sprocket teeth for engaging the marginal perforations on the webs with the webs extending beyond said edge, means for rotating said drum for advancing the webs, a support housing mounted opposite said drum, an exposure ring mounted on said housing adjacent the drum edge and having a circumferentially extending exposure aperture, said exposure ring and said drum having spaced mating surfaces for preventing irradiation from passing therebetween, an irradiation source means mounted entirely within said drums and exposure ring, separate unequally pitched gear segments on said housing and said exposure ring in side-by-side relationship, and a sleeve having a spur gear rotatably mounted thereon for simultaneously engaging both said unequally pitched gear segments and said sleeve rotatable for finely adjusting said exposure ring circumferentially by reason of the interengagement of said spur gear with both said gear segments for adjustably positioning a selected proportion of said exposure aperture in communication with said irradiation source means for irradiating the webs through that circumferential distance.

11. An apparatus for reproducing both image and sound indicia on an irradiation sensitive and heat developable film from separate master films having such image indicia and sound indicia, comprising: a pair of exposure heads having means for irradiating a portion of film passing thereover, means for passing the image master film over one exposure head and the sound master film over the other exposure head, means for passing the irradiation sensitive film over a first exposure head in superimposed relationship on the master film passing over that exposure head to irradiate through the indicia on that master film, means for cooling the irradiation sensitive film immediately following irradiation by said first exposure head for reducing the film temperature substantially below the developing temperature thereof, means for passing the irradiation sensitive film from said cooling means to and over the second exposure head in superimposed relationship with the other master film to irradiate through the indicia on that master film, and means for successively heat developing and desensitizing the irradiated film following irradiation in said second exposure head.

12. The apparatus of claim 11 in which said cooling means comprises a rotatably mounted drum having a heat conductive surface over which the irradiation sensitive film is passed for a substantial proportion of the periphery, and means for affirmatively cooling the heat conductive surface of said drum.

13. The apparatus of claim 12 in which said cooling drum is positioned between said exposure heads and a U-shaped loop of the irradiation sensitive web passes from the first exposure head over the periphery of the drum to the second exposure head, and means supporting said drum for movement toward tightening the loop of sensitive film to insure surface contact between the film and drum.

References Cited

UNITED STATES PATENTS

| | | | |
|---|---|---|---|
| 1,801,450 | 4/1931 | Owens | 88—24 |
| 1,852,894 | 4/1932 | Owens | 88—24 |
| 2,047,474 | 7/1936 | Howell | 95—75 |
| 2,061,069 | 11/1936 | Garbutt | 95—75 |
| 2,063,867 | 12/1936 | Brady | 88—24 |
| 3,157,102 | 11/1964 | Pfaff | 95—75 |

JOHN M. HORAN, *Primary Examiner.*